Patented Oct. 29, 1929

1,733,908

UNITED STATES PATENT OFFICE

WALTHER SCHRAUTH, OF ROSSLAU, ANHALT, GERMANY, ASSIGNOR TO NEWPORT MANUFACTURING COMPANY, OF CARROLLVILLE, WISCONSIN, A CORPORATION OF DELAWARE

PROCEDURE FOR THE PREPARATION OF HYDROGENATED NAPHTHALENE

No Drawing. Application filed August 29, 1921, Serial No. 496,641, and in Germany May 13, 1916.

(GRANTED UNDER THE PROVISIONS OF THE ACT OF MARCH 3, 1921, 41 STAT. L., 1313)

In Patent No. 1,582,310, and in application Serial No. 496,640, filed by Georg Schroeter and the present applicant jointly on August 29, 1921, there are described methods for the purification and hydrogenation of naphthalene, in which naphthalene, purified of catalyzer poisons and mixed with finely divided metals, is heated under pressure to a temperature of over 100° C in the presence of an amount of hydrogen theoretically necessary to effect the desired reaction.

I have discovered by further research that in the place of finely divided metals used in the above-mentioned methods, I may employ to great advantage as catalyzers metallic compounds such as metallic oxides, hydroxides, or metallic salts, either alone, in mixture with one another, or even in connection with other catalysts, and that these improved catalyzing agents possess a distinctly better efficiency than the metals alone.

In the above mentioned Patent No. 1,582,310 an example is given wherein 100 kilos of commercial naphthalene is purified, and then, in molten state, is mixed with 5 to 10% of a catalyzer such as fuller's earth carrying 5% or so of reduced nickel, placed in an autoclave and subjected to hydrogen under a pressure of, say, 10 atmospheres. The reaction mass is agitated in order to facilitate mixing with hydrogen. The temperature should be kept continuously above 100° C., preferably between 150 and 200° C. After 3 kilos of hydrogen have been absorbed (which should require about an hour's time) the liquid material is drawn off, leaving the catalyzer in the autoclave and a new batch of 100 kilos of naphthalene is introduced and the operation repeated. This produces substantially pure tetrahydronaphthalene.

In place of reduced nickel, which is employed in the above example taken from this prior patent, I use metallic compounds. Thus I may employ nickel carbonate in the same process. The resulting product is substantially the same as that obtained in the foregoing example, but by the use of my improvement, the time consumed for the complete reaction is about ½ hour instead of about 1 hour.

The use of other salts, such as nickel formate, nickel borate and the like, results in like advantages. Analogous results are obtained with the oxides and salts of cobalt and other metals useful in the process. Mixtures of metals or metallic compounds show a surprisingly good efficiency as, for example, a mixture of nickel and cobalt salts, or perhaps mixed with cupric salts or the like.

The product like that of the prior processes, may be used for lighting and heating, in internal combustion engines and other machines, as fine lubricating oil, as a cleansing agent, and in other chemical reactions. In particular, light dye stuffs, medicines and explosives can be obtained from tetrahydronaphthalene.

What I claim and desire to secure by Letters Patent of the United States is—

1. In a process for the preparation of hydrogenated naphthalene the step of subjecting naphthalene, prepurified to eliminate catalyzer poisons, to the action of hydrogen in the presence of a mixture of hydrogenation catalytic metal compounds, the treatment being carried on under pressure and at a temperature above 100 degrees centigrade.

2. The hydrogenation of naphthalene which comprises subjecting pre-purified naphthalene to the action of hydrogen at a temperature of at least 100° C. and under pressure, in the presence of a mixture of hydrogenation catalytic metal salts.

3. In a process for preparation of hydrogenated naphthalene, the step of subjecting pre-purified naphthalene to the action of hydrogen under the pressure at a temperature of at least 100° C., and in the presence of a finely divided mixture of nickel and cobalt salts.

4. In a process for preparation of hydrogenated naphthalene, the step of subjecting pre-purified naphthalene to the action of hydrogen under pressure at a temperature of at least 100° C. and in the presence of a mixture of hydrogenation catalysts containing a nickel salt.

5. In a process for preparation of hydrogenated naphthalene, the step of subjecting pre-purified naphthalene to the action of hydrogen under pressure at a temperature of at least 100° C. and in the presence of a hydrogenation catalyst comprising nickel and copper salts.

In testimony whereof I have signed my name to this specification.

WALTHER SCHRAUTH.